May 24, 1960     A. G. BADE     2,937,449
MEANS FOR DETERMINING THE OIL LEVEL IN POWER TRANSMISSIONS
Filed Nov. 18, 1957     2 Sheets-Sheet 1

INVENTOR.
Alfred G. BADE
BY
Quarles & French
Attorneys

May 24, 1960   A. G. BADE   2,937,449
MEANS FOR DETERMINING THE OIL LEVEL IN POWER TRANSMISSIONS
Filed Nov. 18, 1957   2 Sheets-Sheet 2

INVENTOR.
Alfred G. BADE
BY
Quarles & French
Attorneys

United States Patent Office 2,937,449
Patented May 24, 1960

2,937,449
MEANS FOR DETERMINING THE OIL LEVEL IN POWER TRANSMISSIONS

Alfred G. Bade, Brookfield, Wis., assignor to The Falk Corporation, Milwaukee, Wis., a corporation of Wisconsin Filed Nov. 18, 1957, Ser. No. 697,158

4 Claims. (Cl. 33—126.7)

The invention relates to means for determining the oil level in power transmissions and also to means for venting the space above the oil in such transmissions.

It has been found that about ninety-eight percent of the failures of power transmissions in the field are due to the fact that the user either failed to put oil into the transmission housing or did not put enough in. As a consequence, it is very important that some means be provided for easily and quickly determining the level of the oil in the transmission, and one object of this invention is to provide a novel dipstick type of oil indicator that may be used under the varying conditions of these transmissions.

In any oil reservoir type of transmission it is important that it be vented to prevent building up of objectionable pressures due to oil turbulence, and a further object of the invention is to provide means including the dipstick structure for venting the reservoir.

Some power transmissions, for example, those of the shaft mounted type, must be capable of being oriented to work in four different radial positions, and another object of this invention is to provide means, including a common dipstick and its mounting, for measuring the oil level in any of the above noted positions.

A further object of the invention is to provide a dipstick which can be used during the filling operation when the apertured filling plug normally associated with said dipstick has been removed.

A further object of the invention is to provide a cap integral with the dipstick to prevent entrance of water into the filling opening and having a fibrous ring seal attached to it to seal the opening itself but permit the air from the reservoir to be vented.

A further object of the invention is to provide a dipstick structure in which the oil level height is independent of the filling plug height.

A further object of the invention is to provide the apertured filling plug with a tubular extension that projects down into a low pressure area above the oil in the reservoir which permits the unit to breathe without forcing oil out of the vent hole.

The invention further consists in the several features hereinafter set forth and more particularly defined by claims at the conclusion hereof.

Figures 1, 6, 8:
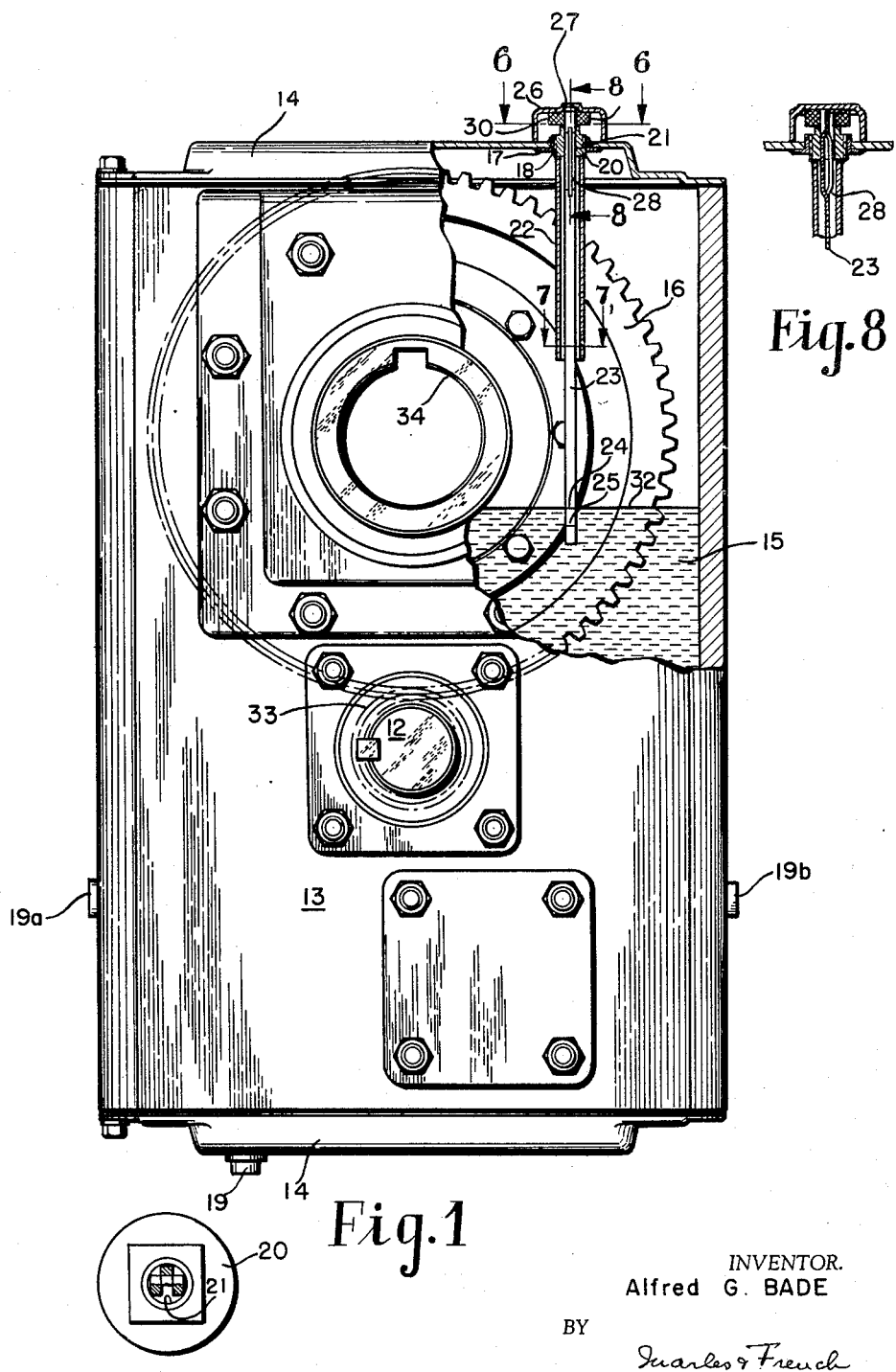
Fig. 1 is an elevational view of a shaft mounted speed reducer transmission with the subject invention applied thereto, parts being broken away and parts being shown in section.
Fig. 6 is a detailed horizontal sectional view taken on the line 6—6 of Fig. 1.
Fig. 8 is a vertical sectional view taken on the line 8—8 of Fig. 1.
Figure 3:
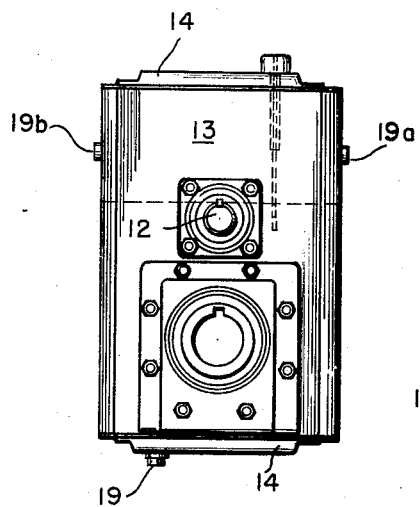
Fig. 3 is a view similar to Fig. 1 showing the transmission in its reversed or twelve o'clock position.
Figure 2:
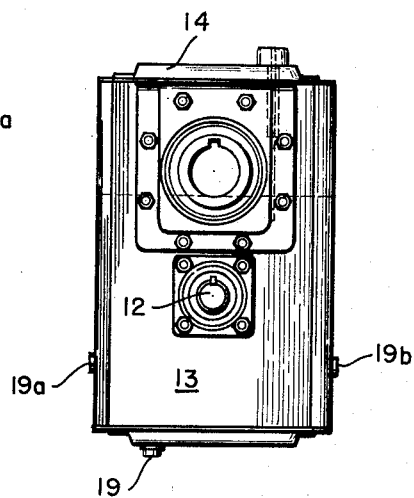
Fig. 2 is a full elevation of the transmission shown in Fig. 1 on a reduced scale.
Figure 4:
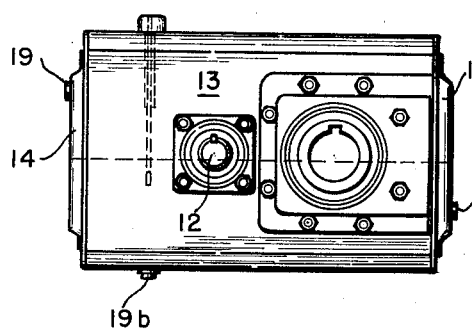
Fig. 4 is a view similar to Fig. 1 showing the transmission in its nine o'clock position.
Figure 5:
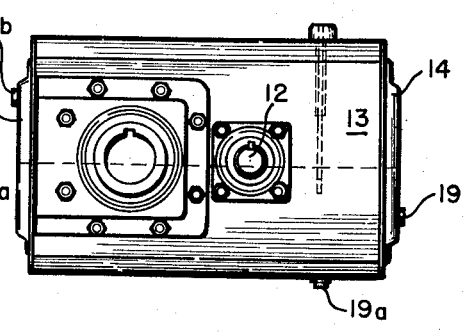
Fig. 5 is a view similar to Fig. 1 showing the transmission in its three o'clock position.
Figure 7:
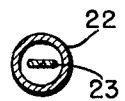
Fig. 7 is a detailed horizontal sectional view taken on the line 7—7 of Fig. 1.

The invention as previously noted is applicable to power transmissions and is especially applicable to those transmissions known as shaft mounted speed reducers where the transmission unit is mounted on the shaft of the mechanism to be driven and may be turned to different radial positions relative to this shaft which on the basis of clock nomenclature may be the six o'clock position shown in Figs. 1 and 2, the twelve o'clock position shown in Fig. 3, the nine o'clock position shown in Fig. 4 and the three o'clock position shown in Fig. 5, it being noted that the input shaft 12 in each instance is in a different position to accommodate different conditions of use met with in practice.

Referring to Figs. 1 to 5, the transmission there shown includes a generally rectangular shaped housing 13 closed at its top and bottom by end caps 14 and providing a support and enclosure for the shafts and gears of the transmission, this housing forming an oil reservoir 15. For the purpose of illustration, a single speed reduction unit has been shown in which the input shaft 12 carries a pinion 33 meshing with a large gear 16 on the hollow output shaft 34 of the transmission which is adapted to be slipped over and keyed to an end of a shaft forming part of the mechanism to be driven.

According to this invention, each end cap 14 has a bushing 17 brazed or otherwise suitably united thereto and having an opening 18 threaded to receive a pipe plug, either a solid plug 19, or an apertured plug 20. Also the opposite sides of the housing have holes similar to the tapped hole 18 of the bushing 17 to receive either the plug 20 or the solid plug 19a or 19b which are interchangeable with the plug 19. The construction of the housing is such that the same oil level measuring device may be used in any of the above mentioned positions of the transmission by the insertion of this device in the then uppermost hole in the housing.

Referring to Figs. 1 and 6 to 8, the apertured plug 20 is similar to an ordinary square headed pipe plug but has a centrally disposed hole 21 extending therethrough and has a hollow metal tube 22 brazed or otherwise suitably united with its lower end. This plug 20 is interchangeable with a solid Allen head type pipe plug such as 19, and it is also removable for filling the reservoir 15.

The dipstick structure includes a rectangular metal rod 23 having high and low oil level indicia marks 24 and 25 thereon and a cap 26 in the form of an inverted cup. At its top the rod 23 is bent at right angles (Fig. 8) to seat in a recess 27 (Fig. 1) formed in the cap 26 and be firmly secured thereto by brazing or spot welding. The lower, peripheral edge of the cap 26 is adapted to seat on a flat portion of the wall of the housing and acts as a stop to determine the inner position of the rod 23 and permit use of the dipstick during filling, when the plug 20 is removed, and also to exclude water from the filling opening. Where the rod 23 passes through the hole 21 in the plug, portions 28 of it are upset laterally in opposite directions as shown in Figs. 8 and 6 to provide a three point guide contact with the sides of said hole. A washer 30 of felt, sponse rubber or other suitable sealing material is affixed to the underside of the cap and normally rests upon and seals off the upper end of the hole 21 of the plug against entrance of dust or other foreign matter. The felt washer 30, however, does not prevent the passage of air through it or from the oil reservoir 15 so that this air can be vented into the cap and from the cap find its way out through spaces that would ordinarily occur between the bottom edge of the cap and the top surface on which it rests, it being noted that these clearance spaces between the cap and the housing for practical purposes would offer substantial barriers to any water that might be splashed onto the then top surface of the housing.

When the dipstick structure is in the position shown in Fig. 1, the level 32 of the oil in the reservoir is indicated by its wetting of the rod 23 and the user is instructed to keep this level within the limits determined by the upper mark 24 and the lower mark 25 when the unit is at rest.

With the transmission in the position shown in Figs. 1 and 2 the opening in the then bottom end plate is used as a drain opening and is closed by the pipe plug 19. When the position of the housing is reversed as shown in Fig. 3, the drain opening just referred to becomes the filling opening and the oppositely disposed opening becomes the drain opening, the plugs 19 and 20 being interchanged.

When the transmission is in its nine o'clock position, the openings in both of the end plates 14 are closed off, one by the plug 19 and the other by one of the side plugs, such as the plug 19a and the dipstick receiving plug 20 is inserted in the opening formerly occupied by the plug 19a.

When the transmission is in its three o'clock position, the openings in both of the end plates are closed off, one by the plug 19 and the other by the plug 19b, and the dipstick receiving plug 20 is inserted in the opening formerly occupied by the plug 19b.

Referring to Fig. 1, as the gears inside the housing 13 revolve, the oil in the reservoir 15 is churned up and creates pressure areas above its main body, the pressures at the top of the housing being greater than those below the same. The tube 22 extends down into the housing so that its inlet opening is in the lower pressure area so that air can pass into and out of the unit through the tube 22 without oil being forced out through the vent.

I desire it to be understood that this invention is not to be limited to any particular form or arrangement of parts except in so far as such limitations may be included in the appended claims.

What I claim as my invention is:

1. In a power transmission, a housing forming an oil reservoir and having oppositely disposed sides and oppositely disposed ends, said sides and ends having pluggable openings, said housing being settable to different radial positions relative to a shaft of said transmission, plugs for said openings, the plug for the uppermost opening of said transmission when said transmission is in any one of its operating positions being a removable hollow plug, and a dipstick mounted on the transmission and having an oil level measuring portion extending through said hollow plug to determine the level of the oil in said reservoir, said dipstick having a penetration limiting top portion whereby oil level may be measured accurately when said hollow plug is removed, as well as when said plug is in the aforesaid uppermost opening.

2. Apparatus as defined in claim 1, wherein the hollow plug has a depending tubular extension forming the entrance end of an air vent through said plug and opening into a low pressure area in the housing above the liquid level therein.

3. In a power transmission having a housing forming an oil reservoir and provided with a filling opening, the combination of an apertured plug for said opening, a tubular extension depending from said plug and extending inwardly into the housing into a low pressure portion of the air space above the preferred liquid level in the reservoir, a dipstick insertable through said plug and tubular extension to extend beyond the extension and into the liquid when the same is at substantially the preferred level, said dipstick having a cap in the form of an inverted cup secured to its outer end to limit the inner movement of said dipstick relative to said housing, the peripheral edge of said cap bearing on a side of the housing outwardly of said apertured plug when the dipstick is in operative position.

4. Apparatus according to claim 3 in which the outer extremity of the apertured plug is substantially flush with the housing and a yieldable sealing member surrounds a portion of the dipstick and is secured to the inner portion of the cap above the peripheral edge thereof to seal the tubular vent passage against the entrance of foreign matter.

References Cited in the file of this patent
UNITED STATES PATENTS

| | | |
|---|---|---|
| 1,857,334 | Rubert | May 10, 1932 |
| 1,954,833 | Schwarzkopf | Apr. 17, 1934 |
| 2,066,931 | Else | Jan. 5, 1937 |
| 2,239,402 | Sachs | Apr. 22, 1941 |
| 2,705,372 | Cornell | Apr. 5, 1955 |
| 2,849,796 | Eshbaugh | Sept. 2, 1958 |